US006882358B1

(12) United States Patent
Schuster et al.

(10) Patent No.: US 6,882,358 B1
(45) Date of Patent: Apr. 19, 2005

(54) APPARATUS, SYSTEM AND METHOD FOR ENABLING EYE-TO-EYE CONTACT IN VIDEO CONFERENCES

(75) Inventors: John Schuster, Bellevue, WA (US); Robert Pierce, Woodinville, WA (US); David Bajorins, Redmond, WA (US)

(73) Assignee: Terabeam Corporation, Falls Church, VA (US)

( * ) Notice: Subject to any disclaimer, the term of this patent is extended or adjusted under 35 U.S.C. 154(b) by 124 days.

(21) Appl. No.: 10/263,865

(22) Filed: Oct. 2, 2002

(51) Int. Cl.[7] .................................................. H04N 7/14
(52) U.S. Cl. ............................... 348/14.16; 348/14.07; 359/15; 353/28
(58) Field of Search .......................... 348/14.01–14.16, 348/211.12, 211.13, 744; 359/15; 353/28, 79

(56) References Cited

U.S. PATENT DOCUMENTS

| | | | | | |
|---|---|---|---|---|---|
| 3,755,623 | A | * | 8/1973 | Cassagne | 348/14.16 |
| 4,821,307 | A | * | 4/1989 | Flint, III | 348/14.01 |
| 4,928,301 | A | * | 5/1990 | Smoot | 348/14.16 |
| 5,117,285 | A | * | 5/1992 | Nelson et al. | 348/14.16 |
| 5,239,373 | A | * | 8/1993 | Tang et al. | 348/14.01 |
| 5,257,130 | A | * | 10/1993 | Monroe | 359/478 |
| 5,317,405 | A | * | 5/1994 | Kuriki et al. | 348/14.16 |
| 5,394,198 | A | * | 2/1995 | Janow | 348/744 |
| 5,532,736 | A | * | 7/1996 | Kuriki et al. | 348/14.16 |
| 5,612,733 | A | * | 3/1997 | Flohr | 348/14.16 |
| 5,666,153 | A | * | 9/1997 | Copeland | 348/14.1 |
| 5,666,155 | A | * | 9/1997 | Mersereau | 348/14.16 |
| 6,042,235 | A | * | 3/2000 | Machtig et al. | 353/28 |
| 6,275,251 | B1 | * | 8/2001 | Hartman et al. | 348/14.01 |
| 6,507,357 | B1 | * | 1/2003 | Hillis et al. | 348/14.16 |
| 6,554,433 | B1 | * | 4/2003 | Holler | 353/79 |

FOREIGN PATENT DOCUMENTS

JP        2000059748 A   *   2/2000    ............ H04N/7/14

* cited by examiner

Primary Examiner—Wing F. Chan
(74) Attorney, Agent, or Firm—Blakely Sokoloff Taylor & Zafman LLP

(57) ABSTRACT

Apparatus, system, and method for enabling eye-to-eye contact in video conferences. In general, the system and apparatus employ means for generating video images corresponding to real images that would be produced if a video camera were disposed at or behind a video display having a field of view directed toward a target object such as a participant. An image (either real, reflected, or holographic) is formed based on light reflected off of the target object, and object light corresponding to the image is received by the video camera, which produces a video signal containing the image. Typically, the means for generating the video images employs direct imaging, reflective imaging, or holographic imaging. The means for generating the video images are also configured in such a manner as to be substantially transparent to video conference participants viewing the display images on the video display. A similar configuration is deployed at two or more conference rooms, thereby enabling participants to communicate with one another using eye-to-eye contact.

26 Claims, 12 Drawing Sheets

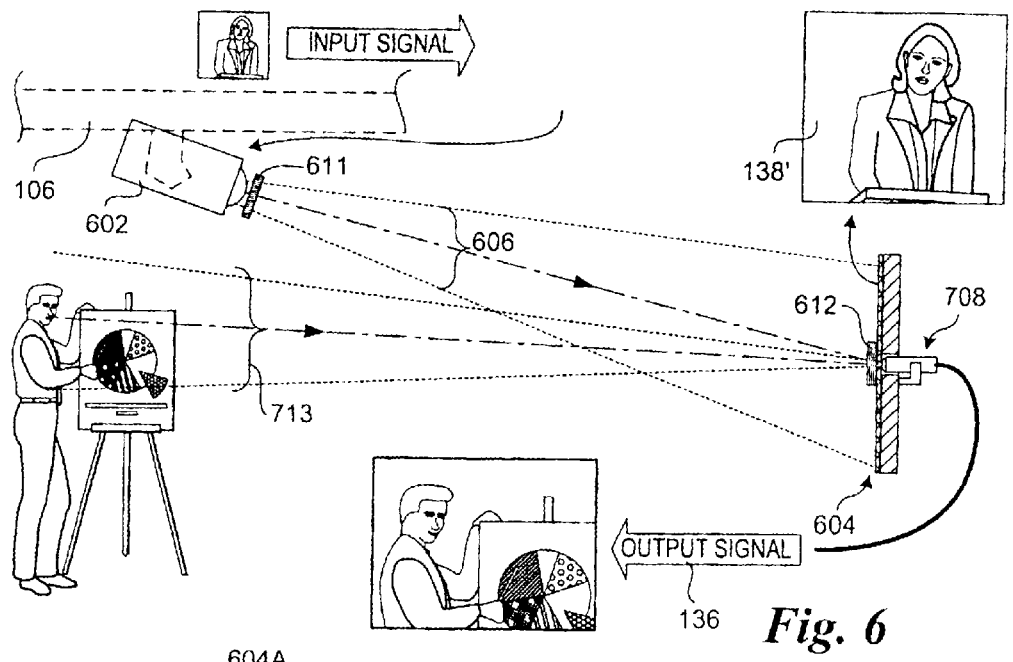
*Fig. 6*
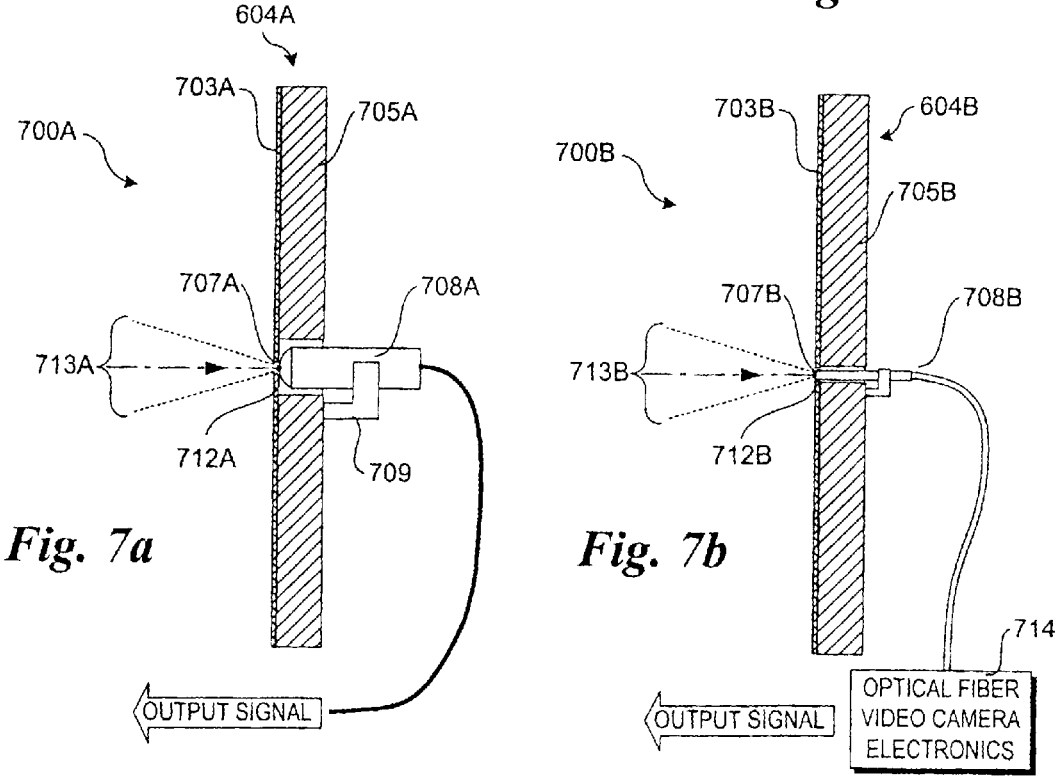
*Fig. 7a*  *Fig. 7b*

*Fig. 12a*
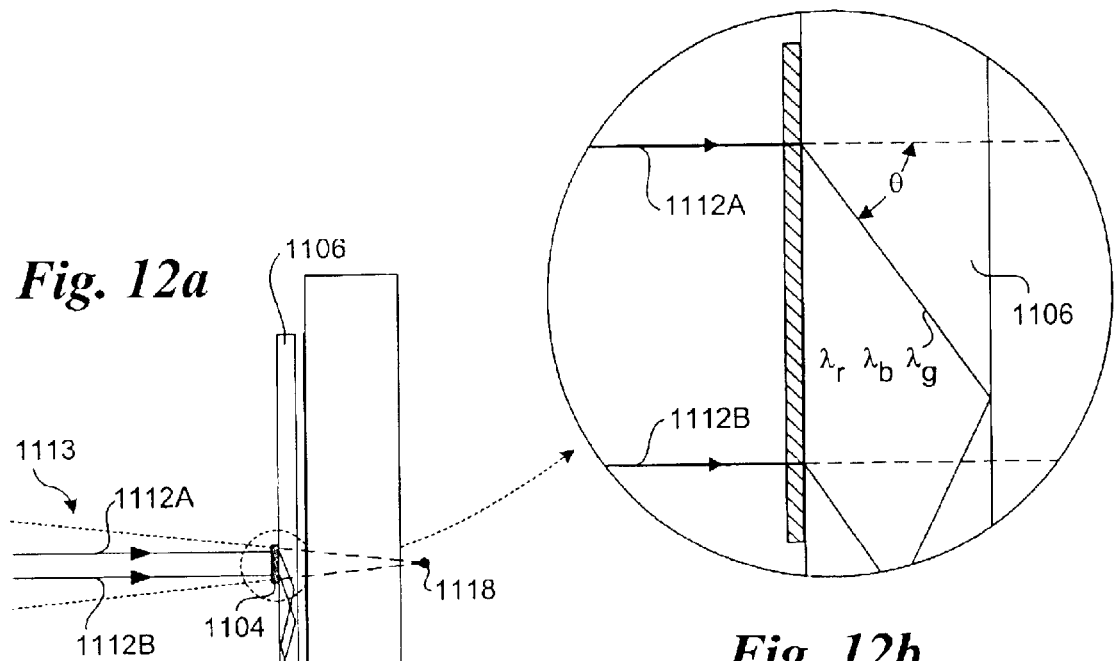
*Fig. 12b*
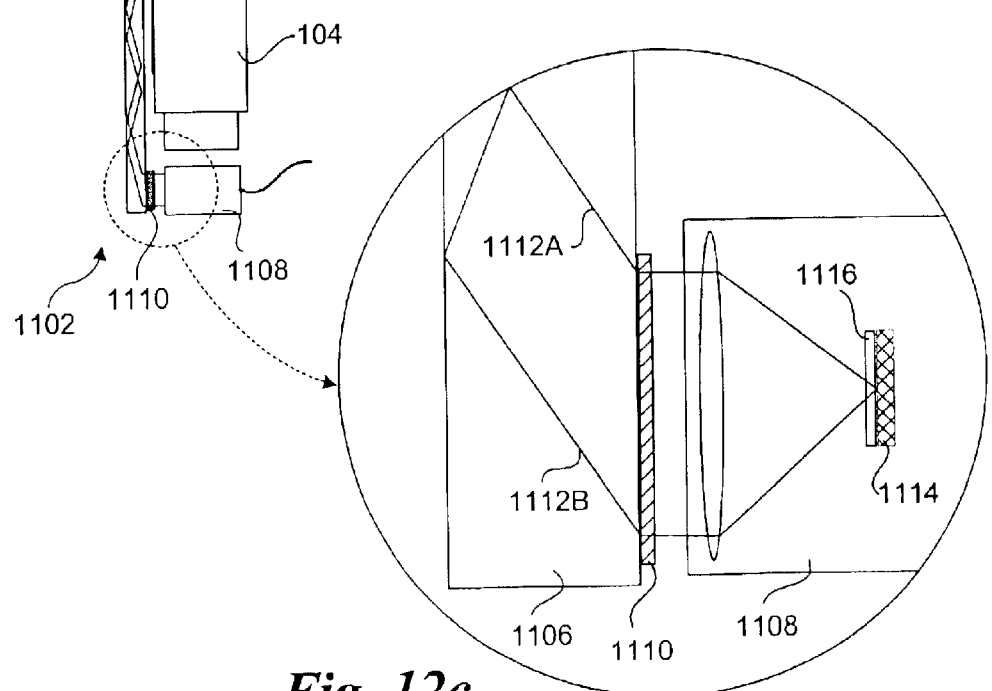
*Fig. 12c*

APPARATUS, SYSTEM AND METHOD FOR ENABLING EYE-TO-EYE CONTACT IN VIDEO CONFERENCES

FIELD OF THE INVENTION

The field of invention relates generally to video conferencing and, more specifically but not exclusively relates to apparatus, systems and methods for performing video conferencing whereby participants are provided with eye-to-eye contact.

BACKGROUND INFORMATION

Recent gains in broadband access has fueled the increasing use of video (tele)conferencing. Video conferencing enables participants at various geographical locations to "meet" at a "virtual" conference that is facilitated via high-speed communication networks and corresponding video conferencing equipment at each conference location. For instance, basic video conferencing equipment typically includes an audio and video subsystem at each location, wherein the video subsystem generally comprises a video camera and a video display (e.g., monitor or video projector and projection screen. The video camera is used to transmit video images of local participants and visual aids to a remote location (i.e., another conference location), while the video display is used to enable participants at one location to view participants and/or visual aids from other conference locations via corresponding video signals transmitted as digital data over the high-speed communication network.

In present video conferencing systems, participants in a conference generally watch the video display to observe the remote conference participants and visual aids. At the same time, the video cameras are usually mounted on the perimeter of the video display or positioned at a fixed location in the conference rooms so they do not block the view of participants wishing to look at the video display. As a result, the conference participants rarely look directly at the video camera in their respective video conference rooms, and when they do so, they are no longer able to easily view their video display. Accordingly, the video images of the conference participants make it appear as if the participants are gazing off into space, rather than looking directly at each other. Thus, although the participants may see each other at times, they cannot achieve eye-to-eye contact. This problem is exacerbated by today's larger video monitors and projection screens, since this forces the angle between the camera direction and the conference participants' focal direction to be increased. This lack of eye contact is a significant drawback, which limits the usefulness of today's video conferencing equipment in providing a natural conversation. Furthermore, without eye-to-eye contact, the trustworthiness of meeting participants is difficult to judge.

Attempts to solve this problem have been devised, with less than adequate results. One such scheme is disclosed in U.S. Pat. No. 5,675,376 to Andersson et al., wherein a controller is employed to calculate eye contours, radius profiles, and positions from images stored in memory. Once the contours and radius profiles are generated, an eye image is "shifted" via pixel manipulation to achieve eye-to-eye contact. As one might expect, this technique produces an unnatural appearance, substantially defeating the purpose of producing the eye-to-eye contact. Furthermore, the participants heads are still heading toward directions that are away from one another.

SUMMARY OF THE INVENTION

In accordance with aspects of the present invention, apparatus, systems, and methods for enabling eye-to-eye contact in video conferences are disclosed. In general, the system and apparatus employ means for generating video images corresponding to real images that would be produced if a video camera were disposed at or behind a video display and have a field of view directed toward a target object such as a participant. An image (either real, reflected, or holographic) is formed based on light reflected off of the target object, and light corresponding to the image is received by the video camera, which produces a video signal containing the image. Typically, the means for generating the video images employs direct imaging, reflective imaging, or holographic imaging. The means for generating the video images are also configured in such a manner as to appear substantially transparent to video conference participants viewing the display images on the video display.

In accordance with a first aspect of the invention, the apparatus employs a partially-reflective plate disposed in front of a video display to produce a reflected image of a target object or objects, typically comprising one or more video conference participants. The reflected image is formed from a portion of light reflected off of the target object(s) received by the partially-reflective plate and reflected toward a video camera's field of view (FOV). The reflected image corresponds to a real image that would be produced if the video camera was disposed behind the video display and its FOV passed through a central portion of the video display screen. The partially-reflective plate also allows light corresponding to video images displayed by the video display to pass through it, thereby enabling the video images to be viewed by conference participants.

In accordance with a second aspect of the invention, the apparatus employs a holographic optical element (HOE) disposed in front of a video display to produce a holographic image of the target object(s). The holographic image is formed from a portion of light reflected off of the target object(s) received by the HOE and redirected toward a video camera's field of view (FOV). In one embodiment the portion of redirected light comprises light having red, blue, and green wavelengths. In one embodiment, a HOE collector, including a receive HOE and an exit HOE disposed on opposite sides of a window, is disposed in front of a video display. Object light having selected wavelengths (e.g., red, blue and green) received at the receive HOE is diffracted at an angle greater than a critical angle for the window, thereby enabling the diffracted light to reflect internally within the window under the principle of total internal reflection (TIR). When the internally-reflected light impinges on the exit HOE, it is directed outward toward a video camera, which then produces a corresponding video output signal.

In accordance with a third aspect of the invention, direct imaging is employed using a video projector, video projection screen, and a video camera. The video projector directs a projected image toward the video projection screen to produce a display image using projected light reflected off of the video projection screen. The video camera is located proximate to a central area of the video projection screen and is enabled, through various means, to receive object light reflected off of objects such as participants generally located opposite the screen, thereby enabling such objects to be imaged. The means include employing apertures in the screen, employing a screen mesh through which a video image may be produced, and using a one-way viewable perforated film applied to a transparent plate.

In accordance with other aspects of the invention, respective apparatus are deployed in two or more video conference rooms in a video conferencing system. Typically, conference participants at respective locations will look toward the center portion the video displays at their locations, wherein they will observe each other. Since the images (real, reflected, or holographic) captured by the video cameras appear as if the video cameras' FOVs pass through the video display screens, the participants are able to use eye-to-eye contact to communication with one another.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 1a and 1b are schematic diagrams illustrating a video conferencing system in accordance with a first embodiment of the invention wherein FIG. 1a depicts object light rays reflected off of a partially-reflective plate to form a reflected image in the field of view of a video camera, and FIG. 1b depicts light rays emitted from a video display passing through the partially-reflective plate to be viewed by a video conference participant;

FIG. 2b is a frontal view of the transparent member and partially-reflective plate of FIG. 2a;

FIG. 6 is a schematic diagram of an embodiment of the invention is which a video camera is disposed behind a video projection screen;

FIGS. 7a–f are detailed schematic diagram illustrating various video projection screen and camera configurations corresponding to the embodiment of FIG. 6, wherein FIG. 7a shows a pinhole camera disposed behind an aperture defined in a projection screen, FIG. 7b shows an optical fiber camera head disposed behind an aperture defined in a projection screen, FIGS. 7c and 7d respectively show a bullet video camera and camcorder disposed behind a seethrough mesh used for the video projection screen, and FIGS. 7e and 7f respectively show a camcorder and a pan and tilt video camera disposed behind a projection screen comprising a one-way viewable perforated film mounted over a transparent plate;

FIGS. 8a–c are schematic diagrams illustrating embodiments of the invention in which holographic optical elements (HOEs) are employed, wherein FIG. 8a shows a reflection HOE disposed over an angled plate, FIG. 8b shows a similar configuration in which a transparent support is coupled to a smaller transparent plate on which a reflection HOE is disposed, and FIG. 8c shows a similar configuration to FIG. 8b in which a transmission HOE is employed;

FIG. 9b is a diagram comprising three graphs used to illustrate the amount of reflected object light received by the video camera in accordance with the HOE configuration employed in FIG. 9a;

FIGS. 11a and 11b are schematic diagrams illustrating a video conferencing system in accordance with an embodiment of the invention employing a HOE collector, wherein FIG. 11a depicts object light rays received by a receive HOE and internally reflected within a window until exiting from an exit HOE and directed toward a video camera, and FIG. 1b depicts light rays emitted from a video display passing through the HOE collector to be viewed by a video conference participant; and FIGS. 12a, 12b, and 12c are schematic diagrams illustrating further details of the operation of the HOE collector of FIGS. 11a and 11b.

DETAILED DESCRIPTION OF PREFERRED EMBODIMENTS

Embodiments of methods, systems and apparatus for enhanced video conferencing that enables eye-to-eye contact are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In general, the various embodiment of the invention described below rely on the common premise of locating the video camera, either physically or virtually, such that it's actual or virtual field of view passes originates behind the video display and passes through central portion of a video display, or substantially originates from a central portion of the video display. Since the conference participants will naturally look toward the video display during the conference, their eyes will be directed toward the origin of the video camera's FOV, rather than away from it, thus enabling eye-to-eye contact between the participants.

Reflected Image Embodiments

Figure 1A:
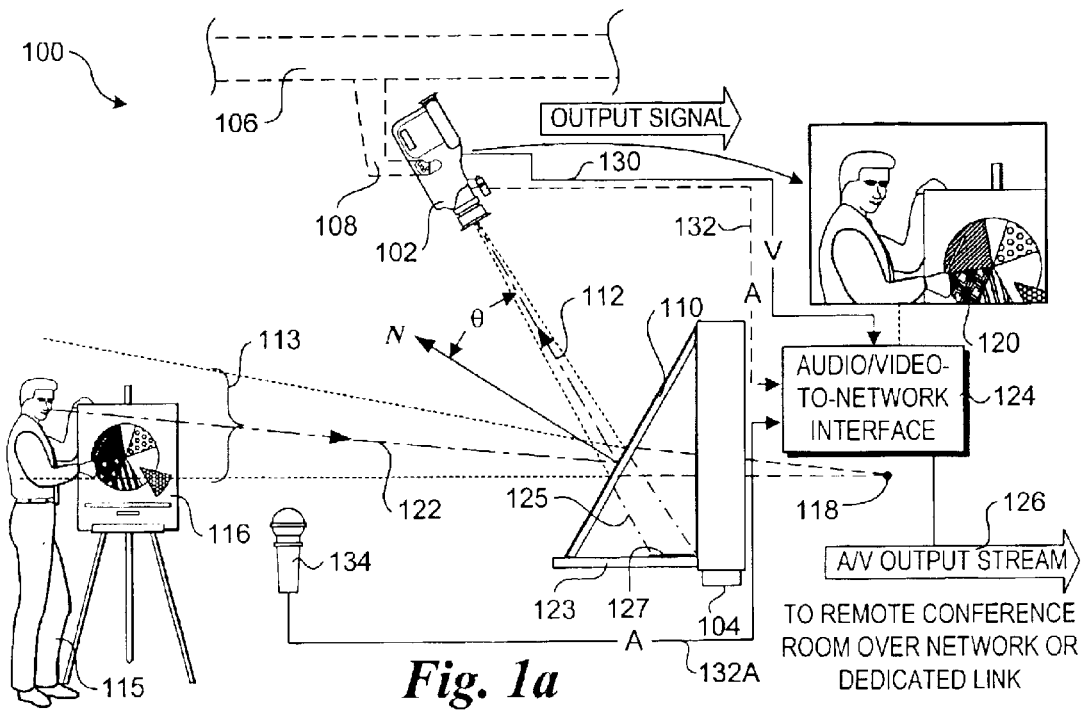
Figure 1B:
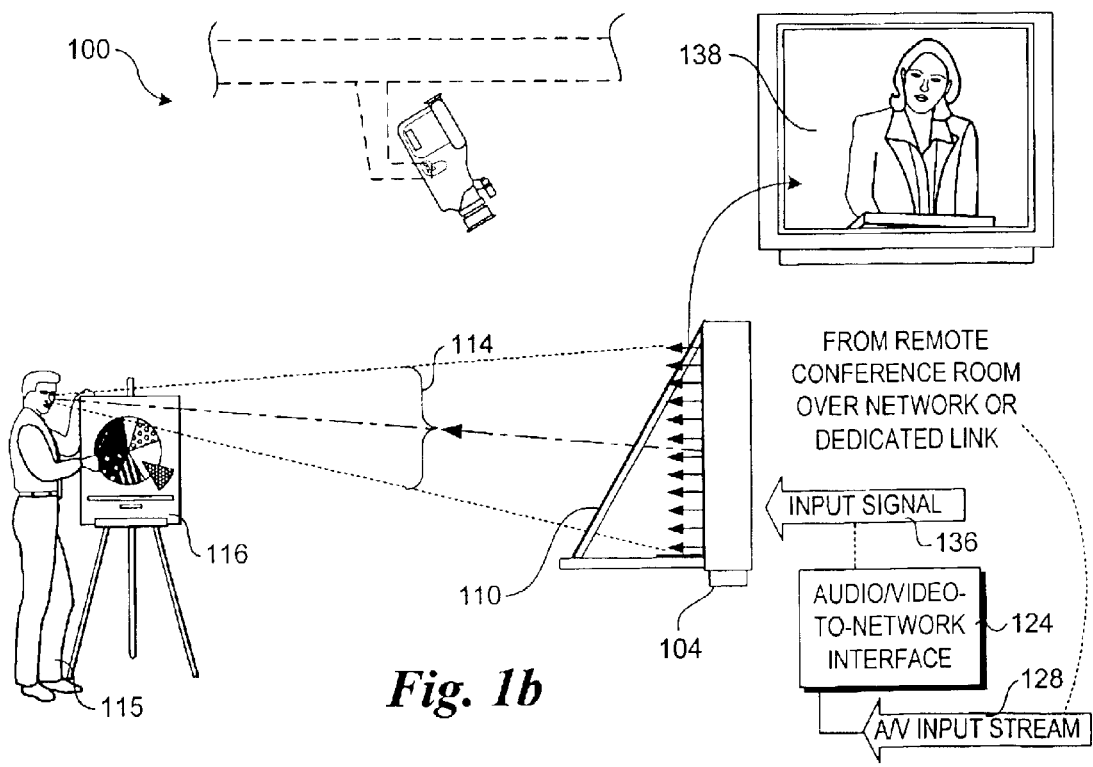

A video conference system 100 in accordance with a first embodiment of the invention employing a reflective imaging scheme is shown in FIGS. 1a and 1b. The system includes a video camera 102 and a video display 104. Although depicted as a camcorder for convenience, video camera 102 may comprise any type of video unit capable of producing a video output signal in response to received light, such as conventional video cameras, optical fiber cameras, pinhole video cameras, remote video cameras, surveillance video cameras, etc. Similarly, video display 104 may comprise any display device capable of displaying a video image, including but not limited to a television, computer or television monitor, flat panel display, plasma display, and projection screen monitor.

Generally, video camera 102 will be mounted to a fixed surface or structure; in the illustrated embodiment it is mounted to the ceiling 106 of a conference room via a camera mount 108. The video camera mount may be a fixed mount, or a may support panning and/or tilting. Video display 104 will typically be supported by a fixed structure, such as a table or stand, or may be mounted to a wall or another type of rigid structure in the conference room.

In a typical implementation, the video camera 102 will be directed toward a partially-reflective plate 110 so as to form an angle of incidence θ between the centerline 112 of the camera's focal direction and an axis N normal to the partially-reflective plate. Generally, the angle of incidence θ may vary over a fairly wide range, although this angle will generally be 45° or less. In one embodiment, the partially-reflective plate comprises a partially-silvered mirror that operates as both a reflective and transmissive optical element, wherein a portion of light will be reflected by the plate and a portion of light will be transmitted through the plate in a manner akin to a beam splitter. Furthermore, the partially-reflective plate effectively operates as a one-way mirror, wherein light impinging on the backside of the silvered surface may pass through more easily. For example, the partially-reflective plate operates as a light reflector when light impinges on the partially-mirrored surface deposited on the front side of the plate (as depicted by a light ray envelope 113 in FIG. 1a), while at the same time it substantially functions as a window (i.e., transmissive element) for light impinging on the backside of the mirrored surface (as depicted by a light ray envelope 114 in FIG. 1b). Thus, a portion of "object" light reflecting off of objects including a participant 115 and visual aid 116 impinges partially-reflective plate 110 and is reflected towards video camera 102. As a result, the reflective function of the partially-reflective plate enables video camera 102 to be virtually located at a virtual focal point 118, causing a video image 120 produced by video camera 102 in response to the light the camera receives to appear as if the video camera was physically located behind video display 104 at virtual focal point 118 and directed along a focal axis 122.

Processes for manufacturing partially-reflective plates of the types used in system 100 are well-known in the art. For example, partially-silvered mirrors are typically used as beam splitters in various types of optical apparatus and systems. In one embodiment, the entire surface area (or substantially the entire surface area) of one side of the plate may be coated with a silver-based compound, via well-known processes such as vapor deposition. In an optional embodiment, only the surface area that is necessary for obtaining the video images need be coated (i.e., the surface area corresponding to the maximum camera field of view that is to be used). One advantage of the first embodiment is that the entire screen will appear the same from a viewer's standpoint, although the video image will be somewhat darkened and there may be some reflected images caused by the partially-reflective plate. The advantage of the latter embodiment is that most of the video image will be transmitted through the plate with no degradation. However, the disadvantage is that a portion of the screen will appear darkened and/or may produce undesired reflections.

Generally, partially-reflective plate 110 will be fixedly secured at a suitable rotation angle in view of geometry considerations, such as field of view (FOV), position of video camera, lighting, etc. In one embodiment, partially-reflective plate 110 is coupled to video display 104 via a support member 123. Typically, such a support member may comprise a frame, a plate-like structure, or a frame/plate structure. In other embodiments, the partially-reflective plate may be coupled to a rigid structure proximate to the video display. The support member may also be kinematically coupled to the partially-reflective plate such that the partially-reflective plate lies flat against the video display when it is not deployed, and is fixedly held in place when it is deployed (not shown).

As further shown in FIGS. 1A and 1B, another geometry consideration concerns the extended field of view 125 behind the partially-reflective plate. Typically, light within this extended field of view may pass through the partially-reflective plate and be received by the video camera, causing reflections and other image degradations. It is therefore desired to minimize the adverse affect of receiving such light at the video camera. Accordingly, in one embodiment a configuration is implemented such that the extended field of view 125 is not directed toward any part of the video display screen. Furthermore, in one embodiment, a non-reflective surface 127, such as a surface painted with flat black paint, is coupled to support member 123 (or included as an integral part thereof) and positioned such is that it lies in the extended field of view.

Under a typical implementation, the video conference equipment shown in FIGS. 1a and 1b will be present in at least one video conference room used for the video conference. In addition to the foregoing equipment, an audio/video-to-network interface component 124 will generally be provided to support sending out an audio/video (A/V) output stream 126 to the other conference room(s) via a computer network or dedicated communication link such as a free-space optical communications system link (both not shown). The audio/video-to-network interface component also enables an audio video (A/V) input stream 128 to be received from the other conference rooms. Generally, A/V output stream 126 will comprise a digital stream having a standard video or television format, and will include a video portion based on a video output signal 130 produced by video camera 102. In some instances, the audio portion of the A/V signal may be provided by a microphone coupled to the video camera and sent to the A/V-to-network interface via a separate signal 132 or may comprise composite signal along with the video output signal (not shown). More commonly, the audio portion will comprise an audio signal generated by one or more microphones 134 located in the conference room, which generate an audio signal 132A.

In general, the A/V output and input streams may comprise a composite stream of audio and video data, or separate audio and video streams, as will be recognized by those skilled in the A/V arts. Under normal conditions, the transmission rate for supporting adequate transfer of the video streams will be much larger than that required for the audio streams. Furthermore, some video cameras, such as surveillance cameras, may provide built-in network interfaces, whereby A/V-to-network interface component 124 may not be required.

In response to receiving A/V input stream 128, the A/V-to-network interface will generate an appropriate input signal 136 that is supplied as an input to video display 104, which in turn produces a video display image 138, which will typically comprise one or more participants, visual aids, or other objects located in the other (or one of the other) conference room(s). The audio portion of the input signal, which will typically be sent over a separate cable, may be used to drive speakers coupled to video display 104 or speakers place in the conference room (both not shown).

Overall, system 100 enables participants located in different video conference rooms to communicate in a more natural manner than is possible with conventional video conference systems. Significantly, participants, such as participant 115, will be able to direct their focus towards the virtual location of the video camera (and thus proximate to the eyes of the other participant on the video display) rather than the physical location of the camera in a conventional system, thereby enabling eye-to-eye contact of the conference participants.

Figure 2:
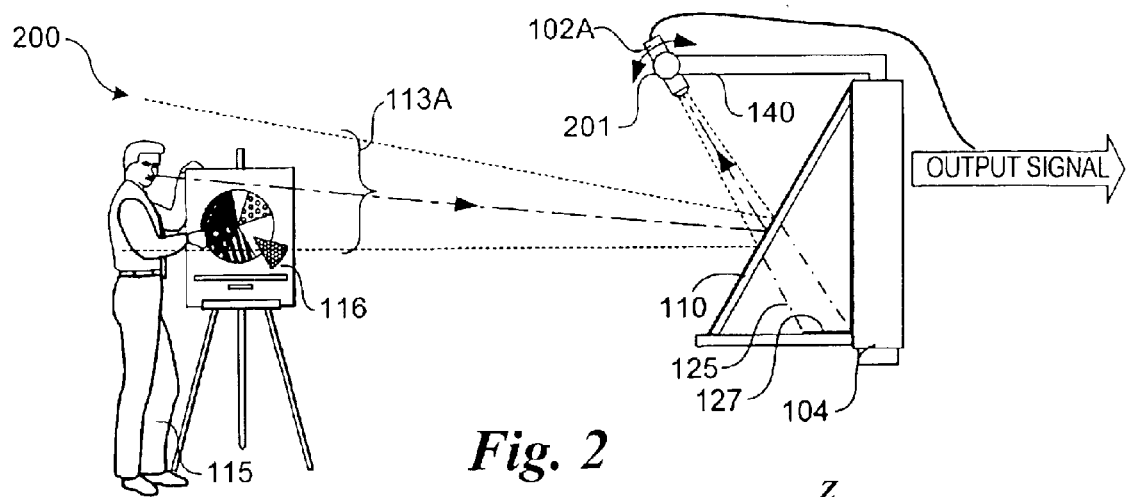
FIG. 2 is a schematic diagram illustrating a first variation of the embodiment of FIGS. 1a and 1b in which the video camera is operatively coupled to the partially-reflective plate.

A video teleconference system 200 having an optional video/camera to video display mounting configuration is shown in FIG. 2. (For clarity, many of the components depicted in FIGS. 1a and 1b, such as A/V-to-Network interface 124 and microphone 134 and corresponding signal paths, have been removed from FIG. 2 and several other system embodiment Figures discussed below; it will be understood that each system embodiment will generally include the same or equivalent components.) Under this configuration, a video camera 102A is operatively coupled to video display 104 via a camera support arm 140. Generally, the camera support arm 140 may be coupled to the video display, a housing in which the video display is housed, a wall or structure to which the video display is mounted, or the partially-reflective plate's support member. The video camera is positioned relative to partially-reflective plate 110 so as to receive light reflected from the partially-reflective plate, as depicted by light ray envelope 113A. In one embodiment, video camera 102A is pivotally coupled toward the end of camera support arm 140 to support a tilt function. Typically, such a tilt function could be automatically controlled using a remote control input that drives a rotary actuator 201.

In accordance with embodiments in which the video camera is coupled to the video display or frame structure disposed generally in front of the video screen, it will generally be desirable to minimize the camera "footprint", thus reducing the overall enclosure size. For example, video camera 102A is depicted as a "bullet" video camera, having a bullet-shaped configuration commonly employed for surveillance cameras and the like. Optionally, other types of small footprint video cameras may be deployed, such as optical fiber cameras and pinhole video cameras.

Figure 2A:
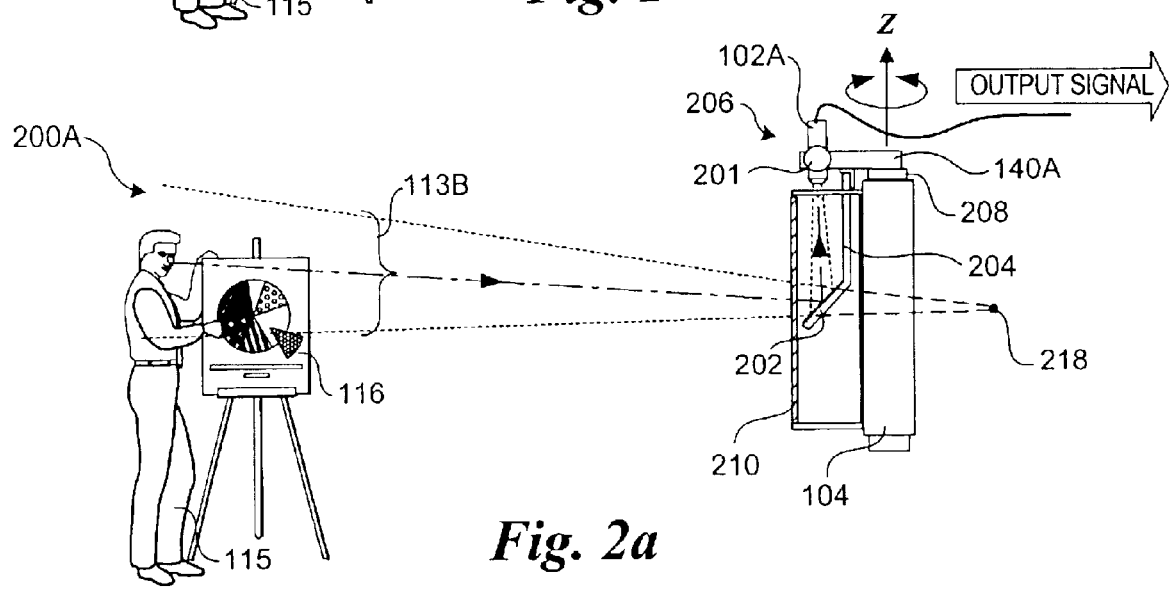
FIG. 2a is a schematic diagram of an embodiment that is a variation of the FIG. 2 embodiment in which a transparent member is used to place a much smaller partially-reflective plate in front of the video display screen.
Figure 2B:
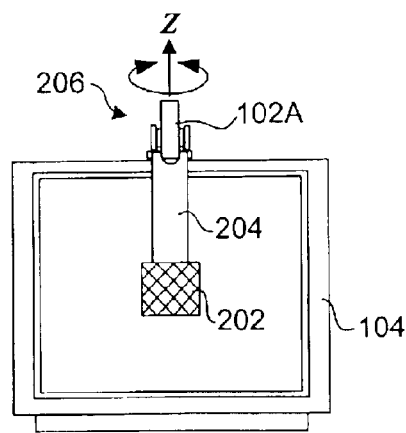

A system 200A comprising a variation of system 200 is shown in FIGS. 2a and 2b. In this embodiment, a much smaller partially transparent plate 202 is coupled to the lower end of a vertically-disposed transparent support member 204. Optionally, the transparent support member and partially transparent plate may be formed of the same component. The upper end of transparent support member 204 is coupled to a camera support arm 140A. In general, transparent support member 204 may be coupled to a frame or otherwise operatively coupled to video display 104 such that partially transparent plate 202 is disposed in front of a central portion of the video display. The video camera is positioned relative to partially-reflective plate 202 so as to receive light reflected from the partially-reflective plate, as depicted by light ray envelope 113B. This configuration produces a virtual FOV origin 218 disposed behind video display 104 with a FOV passing through the central portion of the video display screen.

As an option, the entire partially transparent plate and video camera mounting structure, generally shown at 206, may be pivotally coupled to video display 104 or a frame structure to enable rotation about a vertical Z axis, thereby supporting a panning function. For instance, a rotary base 208 may be employed for such purpose. As with system 200, video camera 102 may also be pivotally-mounted to camera support arm 140A to support a tilt function, e.g., via a rotary actuator 201. By such means, the system could support both remote pan and tilt control.

In some instances, display light passing through partially-transparent plate 202 may be attenuated such that this portion of the displayed video image is darker or otherwise less clear than the other portion of the video image that does not have to pass through the partially-transparent plate. To compensate for this, a filter 210 may be used to "darken" the portion of the light that does not pass through the partially-transparent plate, thereby substantially hiding the existence of the partially-transparent plate and the transparent support member.

Figure 3:
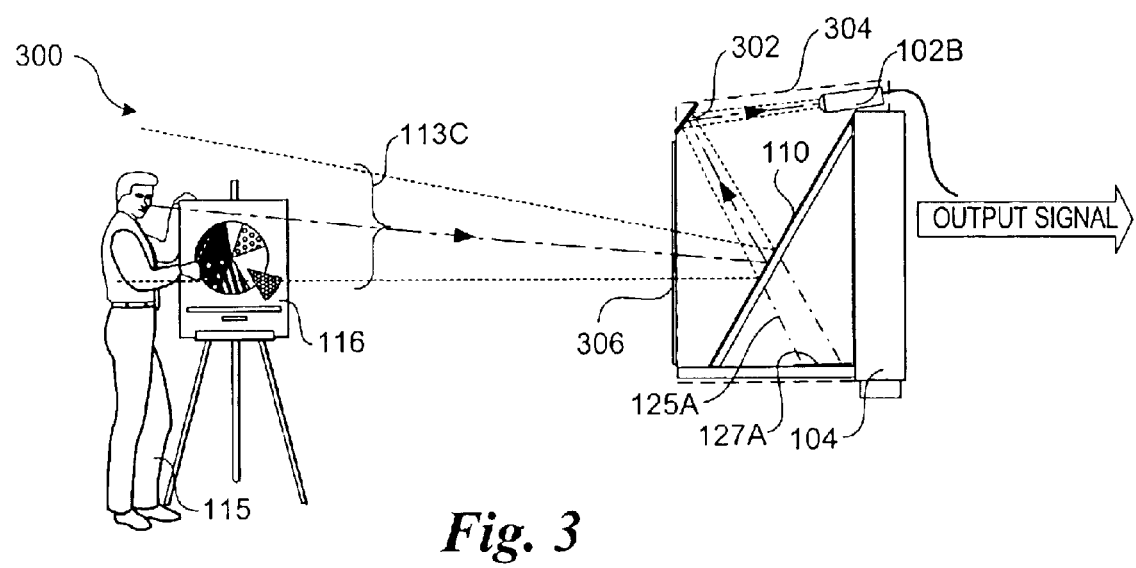
FIG. 3 is a schematic diagram illustrating a second variation of the embodiment of FIGS. 1a and 1b in which a second reflective component is employed to reflect light toward a video camera disposed above the video display.

Another video teleconference system embodiment 300 is shown in FIG. 3. As with systems 200 and 200A, this embodiment preferably employs a small footprint video camera 102B. However, in this instance the system employs a secondary reflector 302 that enables the video camera to be deployed proximate to the video display. As depicted by light ray envelope 113C, light reflected off of the target objects in the video conference room, such as a participant 115 and visual aid 116 is received by partially-reflective plate 110, whereupon the light is first reflected toward secondary reflector 302, and then in turn reflected toward video camera 102B. If desired, the entire assembly may be disposed within a housing 304 which may include a window 306.

In a manner similar to that employed in systems 100 and 100A, video camera 102B, mirror 302, and partially-reflective plate 110 are configured such that a virtual extended FOV 127A of the video camera is directed such that is doesn't include light emitted from video display 104. Furthermore, a non-reflective surface 127A may be provided so as to minimize any reflections of light emitted by the video display.

Figure 4:
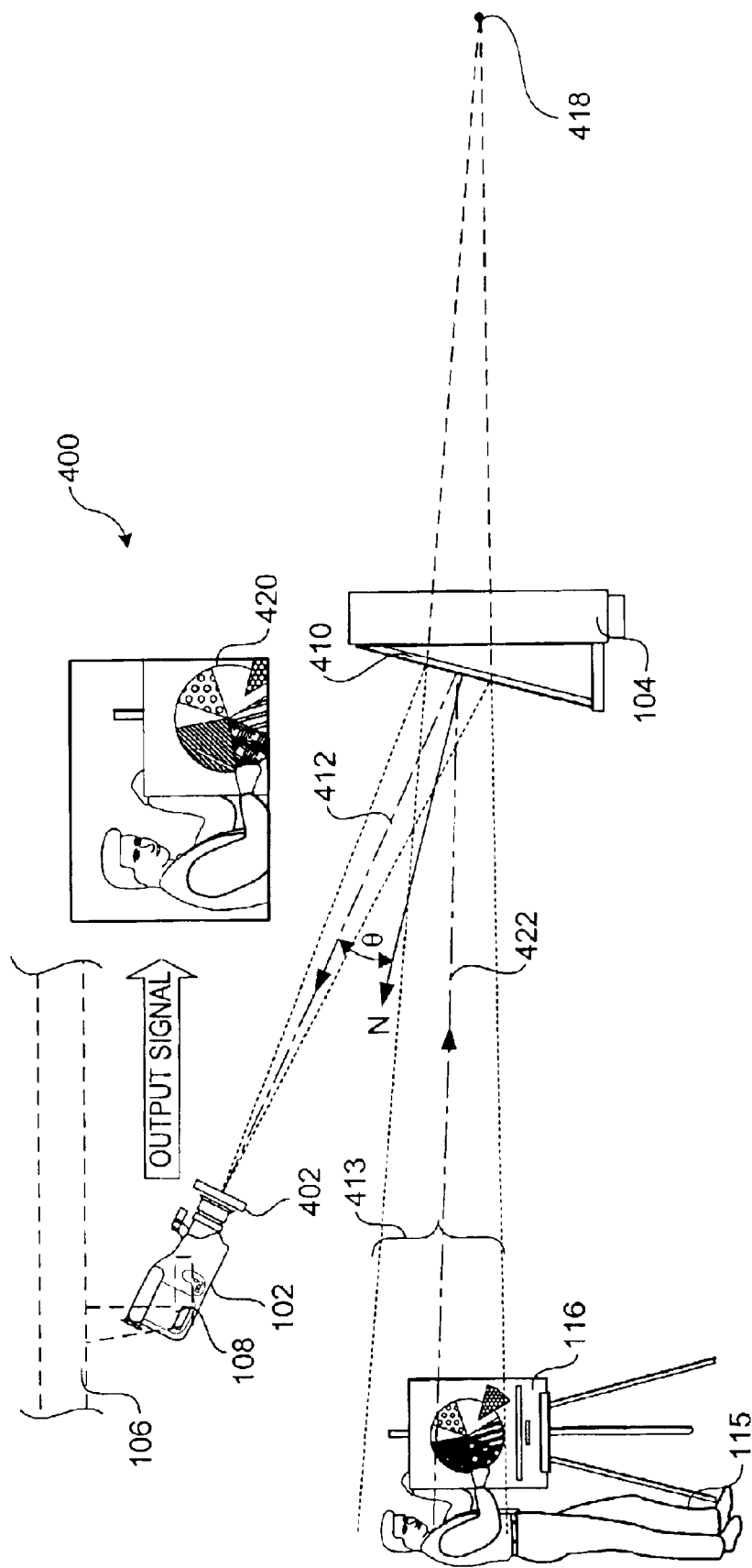
FIG. 4 is a schematic diagram illustrating a video conferencing system in accordance with an embodiment of the invention in which a polarized plate and a polarized camera filter are employed to substantially eliminate undesired reflections and video display images from reaching the video camera.

A video conferencing system 400 in accordance with another embodiment of the invention is shown in FIG. 4. Various components in system 400 are similar to corresponding components in system 100: accordingly, these components, including A/V-to-network interface 124, microphone 134, and signal cables interconnecting the components are not shown for clarity. System 400 employs a similar principle to system 100, in that both systems generate a video output signal based on a reflected image. However, in system 400, light polarization is employed to dramatically reduce the background interference due to the video display light and camera background noise. More specifically, the light polarization is performed through the use of a circular polarized partially-reflective plate 410 disposed at an angle in front of video display 104, and a polarizing optic 402 disposed in front of video camera 102.

As before, video camera 402 is directed at circular polarized partially-reflective plate 410 at an angle of incidence $\theta$, which may vary. The camera receives light reflected by the circular polarized partially-reflective plate that originates as light reflected off of video conference room objects, such as participant 115 and visual aid 116, as depicted by light ray envelope 413 and centerlines 412 and 422. The video camera thus captures a reflected image corresponding to a real image that would be produced if the camera was located behind the video display at virtual focal point 418 and had a FOV directed toward the target object(s).

Figure 5:
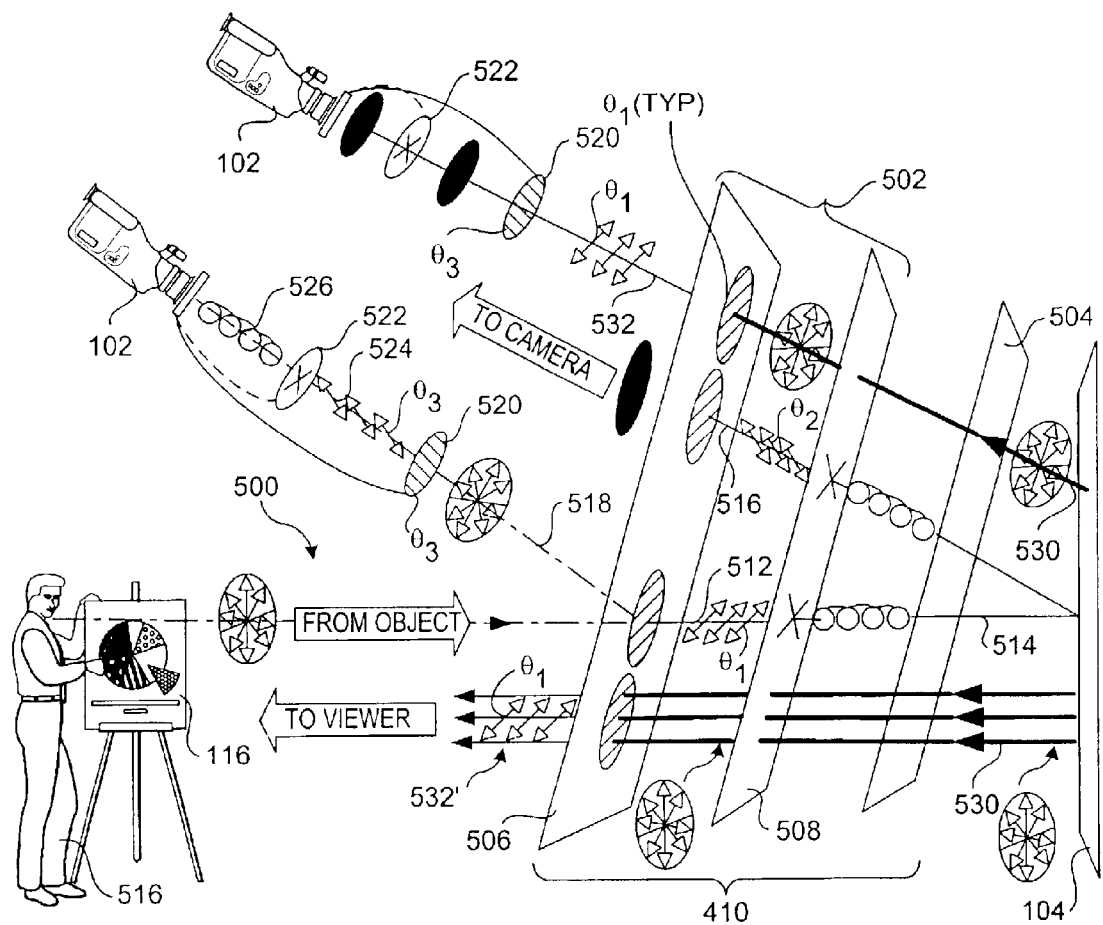
FIG. 5 is a schematic diagram illustrating details of how various light rays are polarized so as to enable desired object light to reach the video camera and to prevent undesired background light from reaching the video camera.

Details of the circular polarizing film and how the embodiment works are shown in FIG. 5. As shown, circular polarizing partially-reflective plate 410 comprises a circular polarizer sheet 502 mounted or otherwise affixed to a transparent plate 504. Generally, transparent plate 504 may be made of any transparent material that provides a suitable planar surface, such as various types of plastics and glasses, for example. In further detail, circular polarizer sheet 502 comprises a linear polarizer 506 and a ¼ wave circular polarizer (also known as a % wave retarder). In one embodiment, circular polarizer sheet 502 comprises a sheet of 0.030" thick Cellulose Acetate Butyrate (CAB), manufactured by Polaroid Corporation, Cambridge, Mass. Preferably, the material used to affix or mount the circular polarizer to the transparent plate should be transparent as well, and/or should not occupy areas on the plate via which video display images can be viewed, which may be accomplished by placing adhesive around the perimeter of the plate.

The polarization scheme works in the following manner. Object light 500 reflected off of video conference room objects comprising randomly polarized light impinges on the surface of linear polarizer 506. A majority of the light passes through the linear polarizer, where it is polarized at an angle $\theta_1$ to produce polarized light 512. The polarized light then passes through circular polarizer 508, emerging as circular polarized light 514. The circular polarized light then passes through transparent plate 504 and reflects off of the display screen of video display 104, whereupon it again passes through transparent plate 504 and reenters circular polarizer 508. The light emerges from the circular polarizer as polarized light 516 at a polarization angle of $\theta_2$, which is rotated 90° from $\theta_2$. The polarized light 516 then enters linear polarizer 506 again. However, since the polarization angle $\theta_2$ of polarized light 516 and the polarization angle $\theta_1$ of linear polarizer 506 are orthogonal, polarized light 516 is substantially blocked from passing through the linear polarizer.

Randomly polarized light 518 comprises the portion of light 500 that is reflected off of the surface of linear polarizer 506. Typically, this will comprise approximately 5% of the light 500, depending on the lighting conditions and angle of incidence. As before, this reflected light is received by video camera 102. However, in this instance, the light must first pass through polarizer 402. In one embodiment, polarizer 402 comprises a linear polarizer 502. In another embodiment, polarizer 402 comprises a linear polarizer in combination with a circular polarizer 522.

Generally, polarizer 402 may comprise a video camera polarizing filter that is typically mounted to the front of video camera 102. These types of filters may be rotated to orient the polarization angle to a desired angle. As discussed below, while this angle doesn't have a substantial affect on randomly polarized light 518, it has a significant effect on light emitted from video display 104. For now, randomly polarized light 518 exits linear polarizer 520 as polarized light 524 having a polarization angle $\theta_3$. When circular polarizer 522 is not employed, polarized light 524 is received by video camera 502. If circular polarizer 522 is employed, polarized light 524 passes through the circular polarizer and exits as circular polarized light 526, which is then received by video camera 502.

A significant advantage over system 400 relates to its ability to substantially prevent light emitted from video display 104 from reaching video camera 102, and thus degrading video image 420. Randomly polarized video display light 530 first passes through transparent plate 504 and then circular polarizer 508. Unlike its affect on polarized light, circular polarizers have minimal affect on randomly polarized light. Next, the randomly polarized light passes through linear polarizer 506, whereupon it exits as polarized light 532 having a polarization angle $\theta_1$. In addition to being directed at the video camera (as illustrated), the majority of polarized light 532 will be directed outward from the video display, as depicted by polarized light 532'.

The light next enters linear polarizer 520. Recall from above, that linear polarizer 520 can be rotated to create a desired polarization angle $\theta_3$. If linear polarizer 520 is rotated such that $\theta_3$ is rotated 90° from $\theta_1$ (i.e., $\theta_3 = \theta_2$), the linear polarizer will block the light from reaching video camera 102. As a result, the light emitted from the video display is substantially prevented from reaching the video camera. In fact, the "background" light is generally reduced by a factor of 1000 to 5000. Furthermore, the contrast ratio, which comprises the amount of object light reflected toward the video camera vs. the background light reaching the camera, will be about 100:1 or better.

Another feature that enables this embodiment to work so well concerns the ability of modern video cameras to produce quality video images under poor lighting conditions. In short, these cameras employ CCD (charge-coupled device) arrays that may have their gain increased (e.g., light sensitivity adjusted) to compensate for the small percentage of object light that is received by the video camera. Furthermore, the video display contrast and/or intensity can be adjusted to compensate for any darkening effect caused by the polarization of its display image.

Direct Imaging Embodiments

With reference to FIG. 6, an overview of a video conference system 600 is shown to illustrate the general configuration and principles employed for embodiments discussed below that employ direct imaging. Under direct imaging, the system configuration is arranged such that the video camera's FOV effectively originates from the central portion of the video display image and the FOV is directed toward the target object or objects to be imaged by the video camera, such as participant 115 and visual aid 116. This enables the video camera to directly image the target object or objects, as if the remote participant was virtually located in the central portion of the video display screen.

In one embodiment, the video display image is produced by a video projector 602, which generates a video image in response to an input video signal 136 and projects light corresponding to the video image on a projection screen 604, as depicted by light ray envelope 606, to produce a projected video image 138'. Generally, video projector 602 may be mounted to ceiling 106 or sit on a table or other horizontal surface. As further shown FIGS. 7a–f, a video camera 708 (e.g., one of video cameras 708A–F) is located just behind the planar surface of projection screen 604 such that the camera's image receiving aperture (from which its FOV substantially originates) is disposed proximate to the central portion of the projection screen.

In one embodiment, respective polarized filters 611 and 612 (size and location of polarized filter 612 exaggerated for clarity) are disposed in front of the video camera lens and the video camera. The polarized filters are rotated such that there angles of polarization are orthogonal to one another, thereby substantially preventing any of the video image light from being received by the video camera.

In accordance with an embodiment 700A shown in FIG. 7A, a video projection screen 604A includes a sheet 703 mounted to a frame 705. A small aperture 707 is defined in the sheet, which will generally painted with a reflective color, such as white. A pinhole camera 708A is operatively coupled to the frame and/or sheet via a mount 709 and is positioned such that its image receiving aperture 712 is disposed just behind aperture 707. As a result, pinhole camera 708's FOV 713A is essentially the same as it would be if projection screen 604A wasn't even present. At the same time, aperture 707 is so small that it is hardly noticeable in the projected video image.

In an embodiment 700B, a sheet 703B is mounted to a frame 705B in a manner similar to embodiment 700A. Also similarly, an aperture 707B is defined in a central portion of the screen. An optical fiber camera head 708B is operatively coupled to the projection screen sheet and/or frame and located behind such that its receive end 712B can receive light passing through aperture 707B, thereby enabling objects falling within an FOV 713B to be imaged. In general, optical fiber video camera electronics 714 contained in a housing separate from the optical fiber video camera head will be used to generate an appropriate video output signal.

Figure 7C:
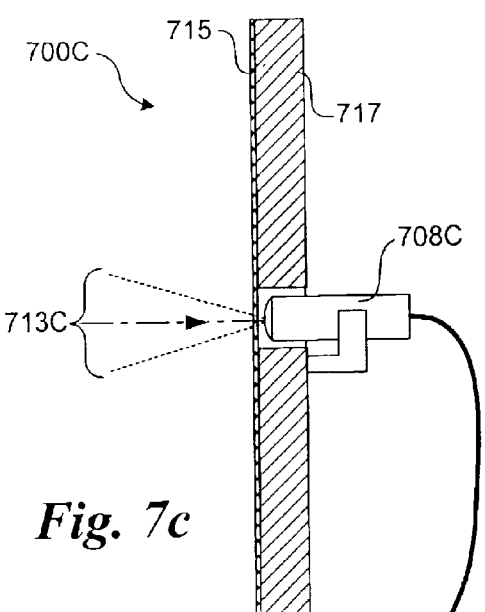
Figure 7D:
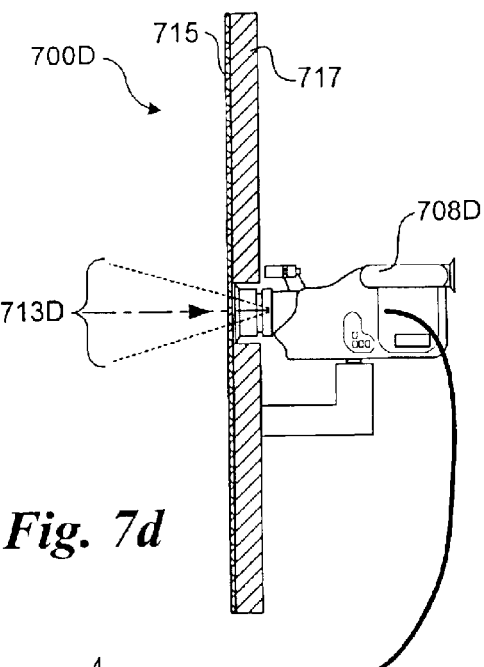
Figure 7E:
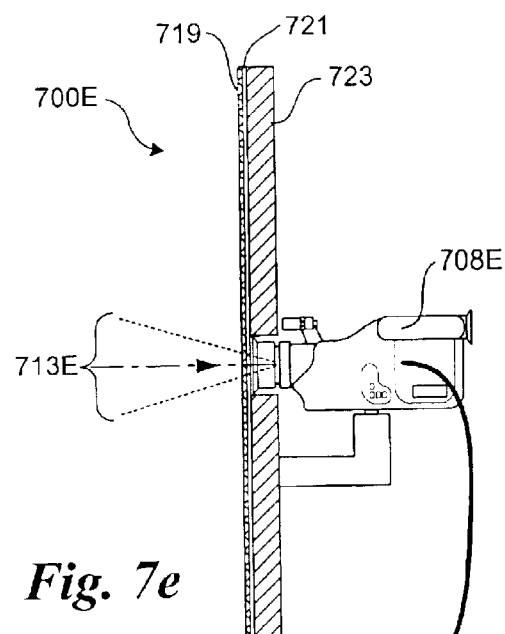
Figure 7F:
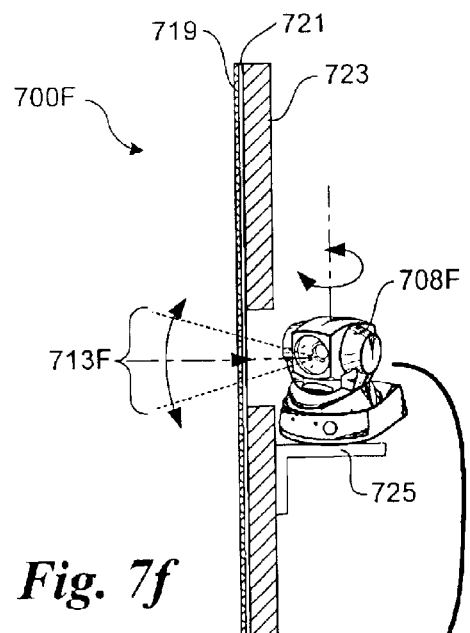

In embodiments 700C and 700D, respectively shown in FIGS. 7c and 7d, a meshed screen 715 is disposed over a frame 717. In embodiment 700C, a bullet video camera 708C is operatively coupled to the video projection screen so as to receive image light passing through a central portion of meshed screen 715, thereby enabling the video camera to image objects falling within an FOV 713C. Similarly, in embodiment 700D, the receive optic of a camcorder 708D is disposed behind the meshed screen 715 to enable objects falling within an FOV 713D to be imaged.

In each of embodiments 700E and 700F, a one-way viewing perforated film 719 is mounted over a window 721. The window, in turn, may be mounted to a frame 723. Generally, the one-way viewing perforated film may be silk-screened, painted or printed such that the perforated film forms a surface suitable for reflecting a projected video image. In one embodiment, the perforated film comprises CLEAR FOCUS™ One Way Vision™ or SuperVue™ window-graphics film manufactured by Clear Focus Imaging, Inc., Santa Rosa Calif.

In embodiment 700E, a camcorder 708E is operatively coupled to window 721 and/or frame 723 such that its receiving lens is disposed behind window 721. The perforated film operates in a manner that enables incoming light rays to be reflected off of it, while at the same time enabling light rays that are substantially normal to the window to pass through the window. This enables camcorder 708E to image objects within an FOV 713E.

In the case of embodiment 700F, a video camera 708 mounted on a pan and tilt base is disposed behind window 721. The pan and tilt base is typically mounted on a bracket 725 coupled to either window 721 or frame 723. In one embodiment, the video camera comprises a model EVI-D100 pan tilt and zoom teleconference camera made by Sony Corporation. Thus, embodiment 700F enables objects falling within a movable FOV 714B to be imaged.

Holographic Image Embodiments

In accordance with further aspects of the invention, holography techniques are employed to produce holographic images from which corresponding video images may be produced. Generally, a holographic optical element (HOE) will be employed to diffract (i.e., bend) incoming object rays toward the receiving optic of the video camera. Both reflective and transmission holography techniques may be used.

Figure 8A:
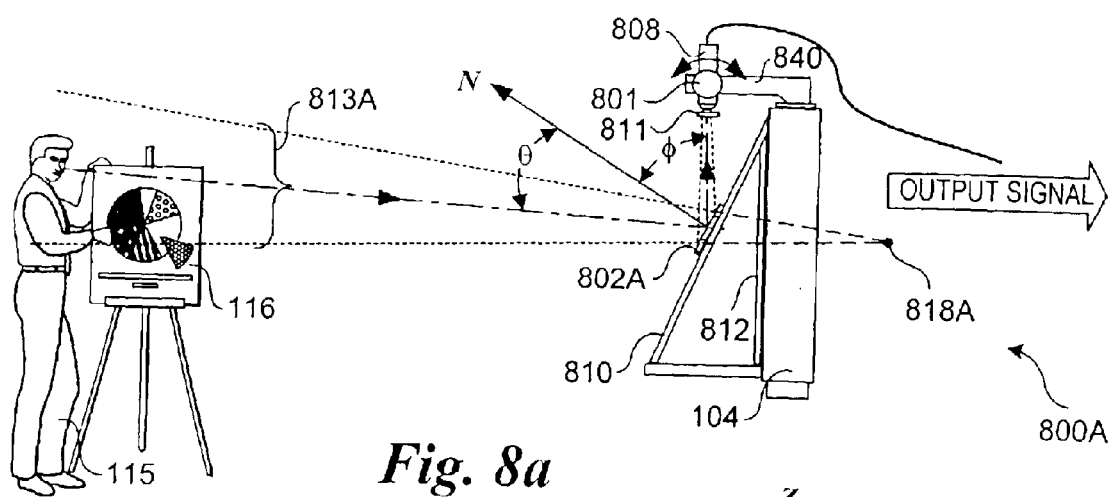

For example, in an embodiment 800A shown in FIG. 8a, a HOE 802A is formed in the central portion of a transparent plate 810. HOE 802A, which comprises a reflective HOE, redirects object light from target objects such as participant 115 and visual aid 116 having selected wavelengths toward a camera 808. (As explained in further detail below, HOE 802A comprises an interference pattern that is formed on transparent plate 810 by exposing an emulsion to one or more lasers producing light corresponding to the wavelengths desired to be redirected.) At the same time, light having a different wavelength than the selected wavelength (s) passes through the HOE substantially unperturbed. In an optional configuration, polarizing filters 811 and 812 having orthogonal angles of polarization may be employed in a manner similar to that described above to prevent video image light emitted from video display 104 from being received by the video camera. As another option, video camera 808 may be pivotally coupled to a support member 840 via a rotary actuator 801.

Unlike a mirror, a HOE can redirect light such that the reflective angle $\Phi$ is different than the angle of incidence $\Theta$. Accordingly, embodiment 800A produces an effective FOV 813B that appears to originate from an origin 818A. Generally, the relative angles $\Phi$ and $\Theta$ will depend on how the interference pattern is manufactured (e.g., orientation of the laser(s) beam splitters, and other optical elements relative to the surface the emulsion is applied to), the material used and the selected wavelength(s), as described below.

Figure 8B:
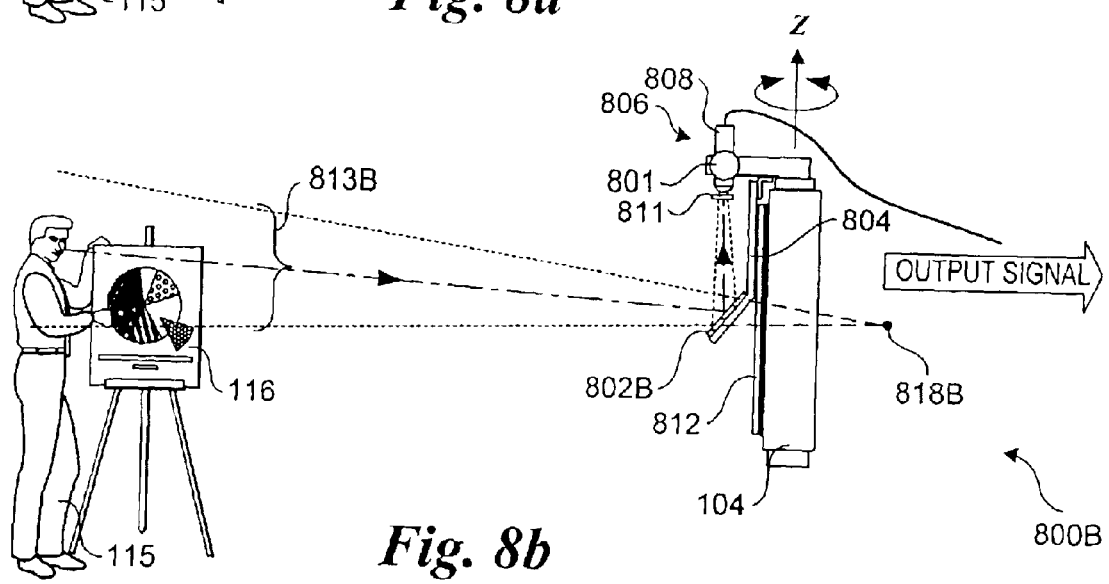

In an embodiment 800B shown in FIG. 8b, a reflective HOE 802B is disposed over an angled portion of a transparent support 804 that is configured in a manner similar to that discussed above with reference to transparent support member 204 and partially-transparent plate 202 in Figure 2a. Also, in a similar manner to support structure 206 of FIG. 2a, support structure 806 may be pivotally coupled to video display 104 or a support frame to enable a pan function comprises rotation about the Z axis. This configuration produces an effective FOV 813B having an origin 818B.

Figure 8C:
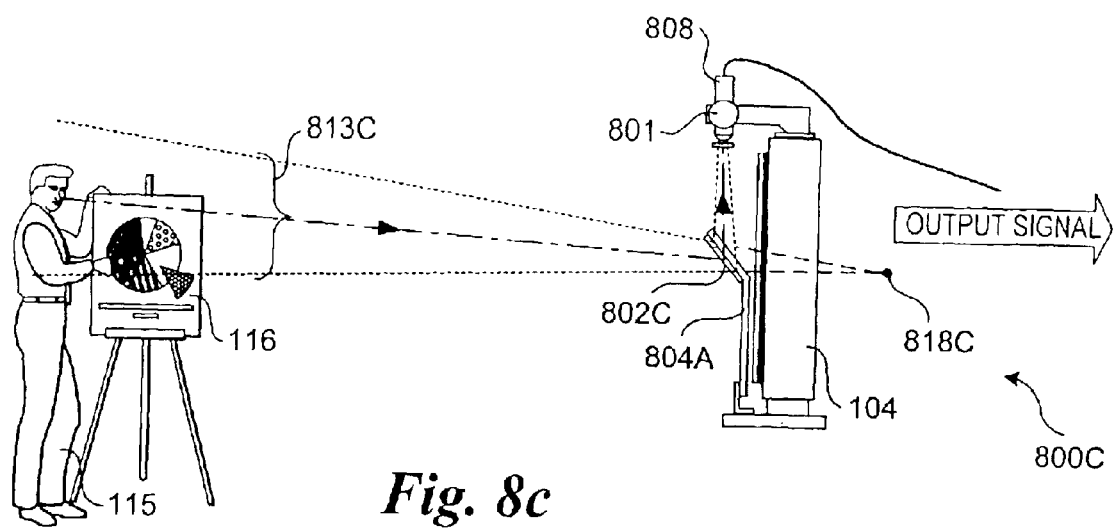

In an embodiment 800C shown in FIG. 8C, a similar configuration to that employed in FIG. 8B is used involving a transparent support member 804A. However, in this instance a transmissive HOE 802C is employed rather than a reflective HOE. This configuration produces an effective FOV 813C having an origin 818C.

Figure 9A:
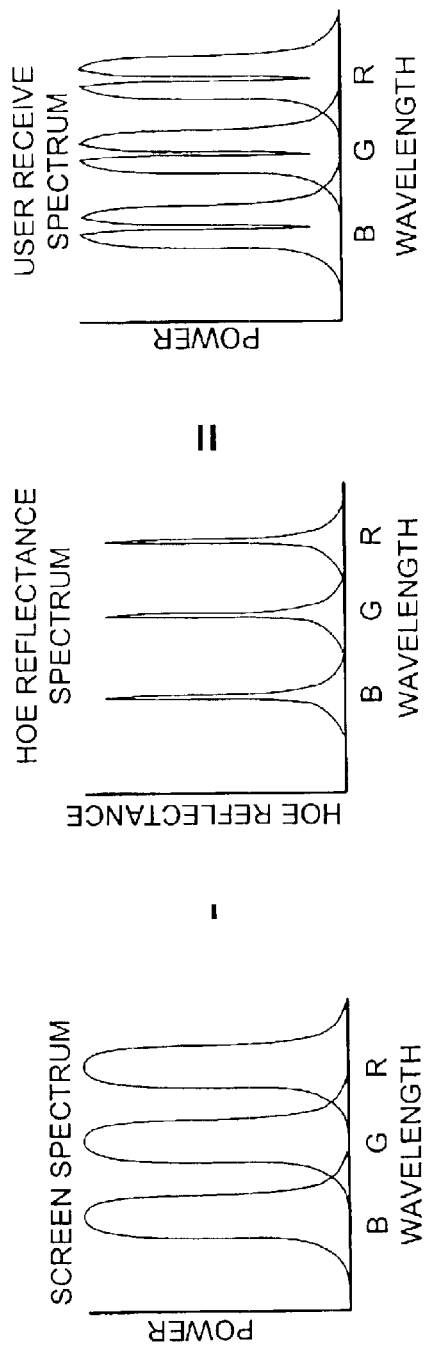
FIG. 9a is a diagram comprising three graphs used to illustrate the portion of the light spectrum received by a viewer after the light passes through a HOE having an interference pattern configured to diffract red, green, and blue wavelength light.
Figure 9B:
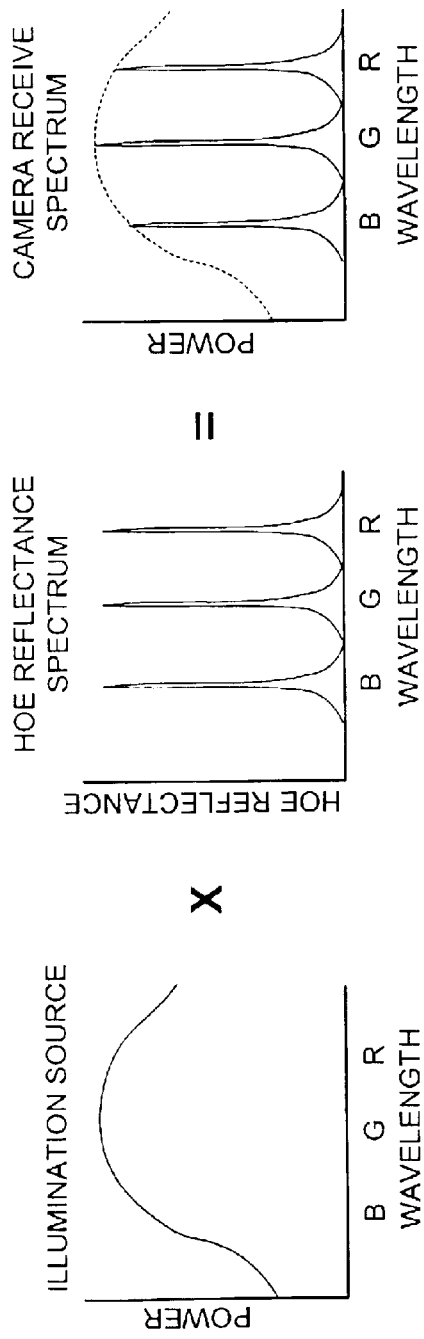

As shown in FIG. 9a, the light corresponding to the spectrum the user receives will comprise light emitted from the video display minus the light impinging on the backside of the HOE that is redirected by the HOE. Also, the amount of light the video camera receives will be a function of the illumination source on the target object(s) times the HOE reflectance spectrum (or HOE transmission spectrum, if a transmission HOE is used).

In general, it will be desired to capture images with the video camera corresponding to a normal color spectrum. Under this consideration, modern video cameras typically employ a CCD having three photonic sensors for each pixel in the output image, wherein a Bayer Filter is disposed over the array of photonic sensors. The Bayer Filter is composed of three filters, red, green, and blue, arranged in a mosaic pattern. Accordingly, if a color image is desired and conventional video camera is to be employed, the selected wavelengths of the light to be diffracted by the HOE should match the wavelengths of the filters employed in the Bayer filter. If a custom video camera is to be employed, the Bayer filter (or other color filtering element) can be adapted to match the selected wavelengths. Generally, in this situation, the selected wavelengths should corresponds to colors from which a full color spectrum can be generated.

Figure 10:
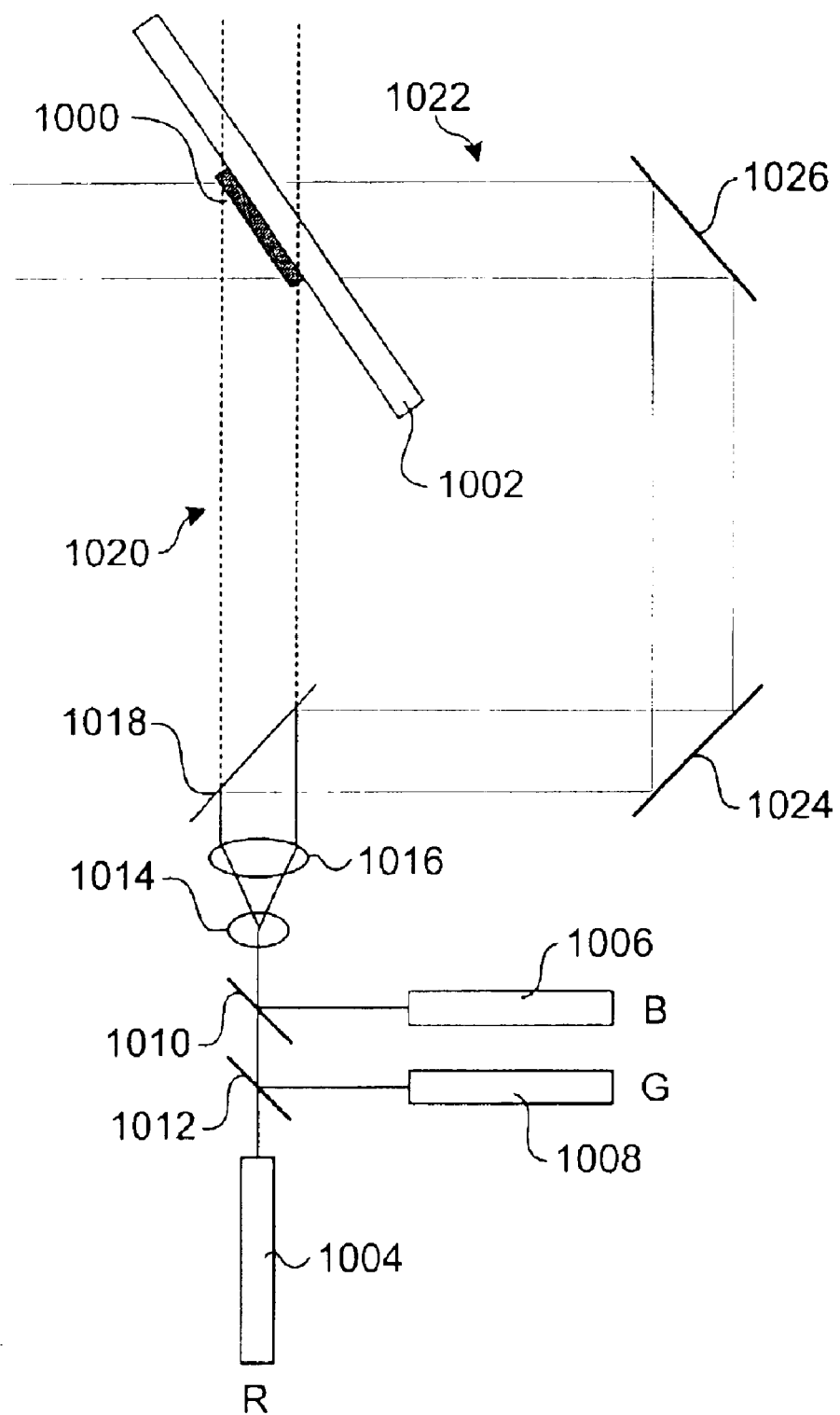
FIG. 10 is a schematic diagram illustrating a method for producing an HOE having an interference pattern to diffract red, green, and blue wavelength light.

A recording process for manufacturing a reflective HOE in accordance with one embodiment of the invention is illustrated in FIG. 10. During the recording process, an interference pattern is formed in an emulsion 1000 that is applied to a glass plate 1002, such as BK-7 glass, by exposing the emulsion to laser beam light having the selected wavelengths for the to-be-diffracted light. Typically, these wavelengths will be approximately 656 nanometers (nm) corresponding to red light, 486 nm corresponding to blue light, and 587 nm corresponding to green light, which are respectively produced by a red laser 1004, a blue laser 1006, and a green laser 1008. A pair of beam splitters 1010 and 1012 are disposed along the path of the red laser so as to combine the red, blue and green laser light at an optic 1014. The combined laser light diverges from optic 1014 and is collimated by a collimating lens 1016. A portion of the collimated light passes through a beam splitter 1018 as light rays 1020, exposing a front side of emulsion 1000 to the light. Another portion of the collimated light comprising light rays 1022 reflects off of beam splitter 1018 and mirrors 1024 and 1026, causing this portion of the light to be directed at the backside of emulsion 1000. An interference pattern is formed in the emulsion at the intersection of light rays 1020 and 1022 defining Bragg conditions for the wavelengths of light provided by the red, blue and green lasers 1004, 1006, and 1008.

Various types of suitable mixtures can be used for the holographic emulsion, as will be recognized by those skilled in the holography arts. In one embodiment, a dichromated gelatin material can be used. An example of a suitable type of gelatin, which can be mixed with dichromate according to ratios known by those skilled in the art, is designed by Ralcon Development Lab, located at Paradise City, Utah, and manufactured by Kind & Knox Gelantine, Inc., located at Sioux City, Iowa, under their Gelita™ line of optical gelatins, Type 7644, Lot 2. In another embodiment, a photopolymer material with low shrinkage characteristics and which does not require heating can be used. An example of such a photopolymer material is product number HRF-600×113-6*0.5 GB/TRANS, available from DuPont Holographics, Experimental Station, P.O. Box 80352, Wilmington, Del. 19880-0352. An anti-halation layer (not shown) can be applied over the emulsion prior to commencement of the recording process.

Figure 11A:
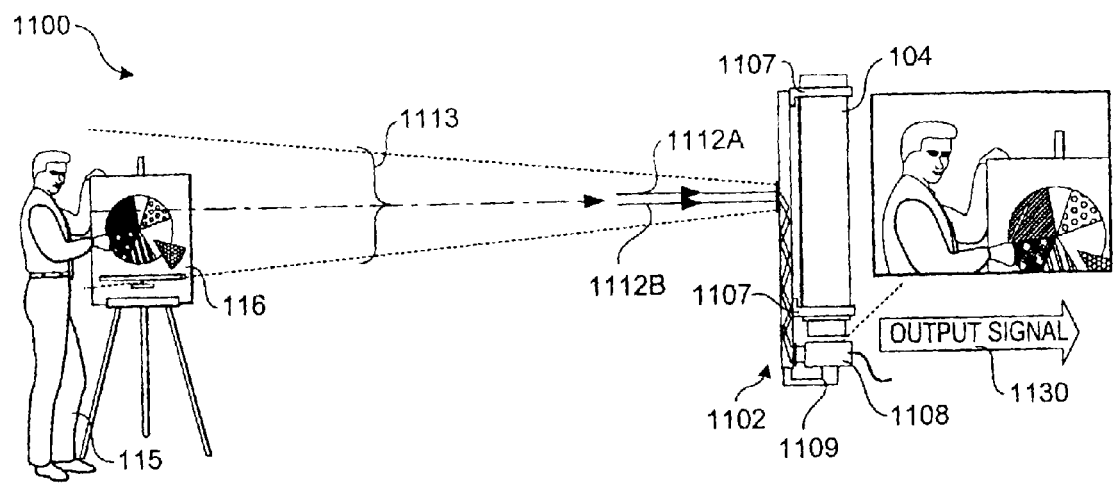
Figure 11B:
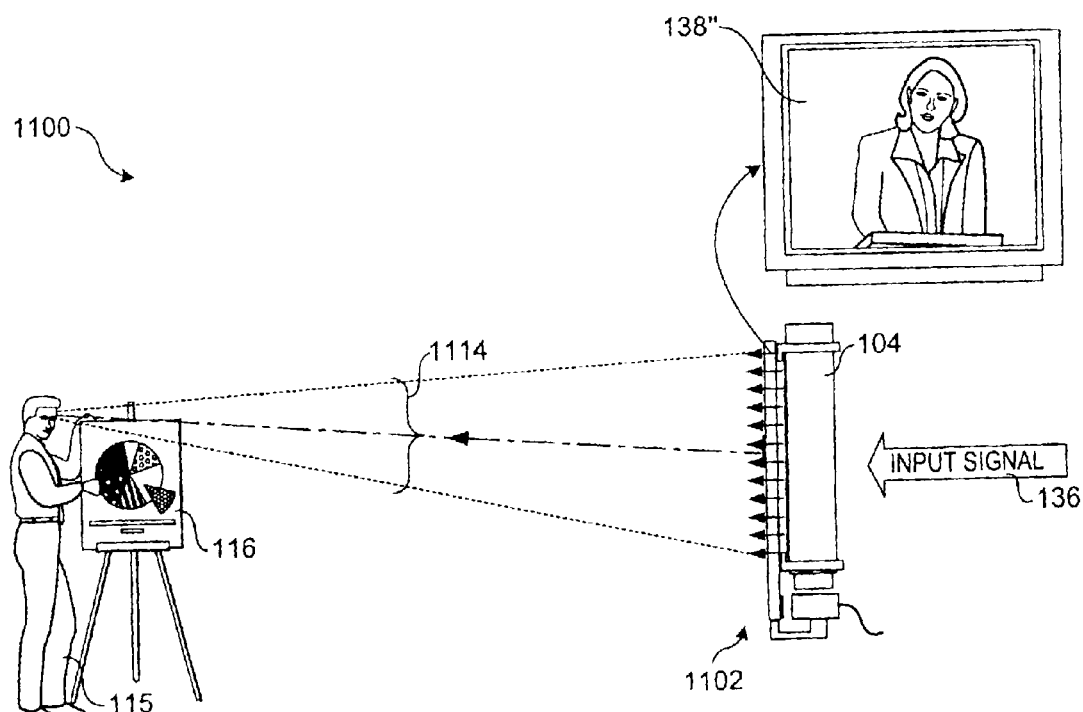

An overview of a video conferencing system 1100 that employs a HOE collector 1102 is shown in FIGS. 11a and 11b, while further details of the HOE collector are shown in FIGS. 12a, 12b, and 12c. The HOE collector includes a receive HOE 1004 disposed on the front side of a window 1006 that receives incoming object light, and an exit HOE 1110 disposed on the back side of window 1006 toward a peripheral portion of the window (the bottom in the illustrated embodiment). The window 1006 is generally placed in front of video display 104. In one embodiment, the window may be deployed in front of the video display via a mounting structure that is either couples the window to the video display or to a structure to which the video display is mounted, as depicted by mounts 1007. A video camera 1108 is coupled to the window via support arm 1109 and is disposed behind the exit HOE to receive light exiting therefrom and to capture such light to produce a video image corresponding to the object light. As incoming object light, as depicted by light rays 1112A and 1112B impinges on receive HOE 1104, light having frequencies corresponding to the selected frequencies used to make the receive and exit HOEs (depicted as $\lambda_r$, $\lambda_b$, and $\lambda_g$) is diffracted downward an a diffraction angle $\Theta$, while light having other wavelengths simply passes through the receive HOE, as shown in FIG. 12b. Diffraction angle $\Theta$ is selected such that it exceeds the critical angle of window 1006, whereby the diffracted light is internally reflected upon impinging the outer sides of window 1006 under the principle of total internal reflection (TIR) rather than being allowed to escape. (In contrast, light diffracted at an angle less than the critical angle for the window material will escape out the backside of the glass.) The TIR condition is partly due to the lower coefficient of refraction for the air on the back side of the window than the coefficient of refraction of the window itself. The light rays continue to internally reflect until the reach exit HOE 1110. Since the exit HOE emulsion comprises a material with a higher coefficient of refraction than the window, the light rays are allowed to escape outside of the window. Furthermore, a second diffraction condition is created at the interface between the back surface of the window and the exit HOE, causing the light rays to be directed outward through the exit HOE, as shown in FIG. 12c.

The video camera 1108 is positioned so as to receive the light exiting the window through the exit HOE. The received light is then focused onto an imaging element, which will typically comprise a CCD 1114 over which a Bayer filter 1116 is disposed, although other configurations may be used as well. In response to the light received at the imaging element, the video camera produces an output signal 1130 via which a video image corresponding to the imaged object(s) in the local conference room may be displayed on a video display in a remote conference room.

The effective result of the HOE collector is that images produced at the video camera's imaging element appear the same as if the video camera's FOV originated at a focal point 1118 and passes through a central portion of the video display, as illustrated by FOV 1113. At the same time, light emitted from video display 104 corresponding to received video image 138" passes through window 1106, enabling the received video image to be easily viewed, as depicted by a light ray envelope 1114. It is noted that portions of the light emitted from the display in the area immediately behind receive HOE 1104 having the selected wavelengths may be diffracted so that it doesn't fall within light ray envelope 1114, and thus will not be seen by the viewer. However, this will generally have minimal effect on the viewed video image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:

a video display means; and means, including a video camera, for generating a video signal corresponding to an image of an object or objects generally located opposite the video display means, wherein the image corresponds to a real image that would be effectively produced if the video camera was located relative to the video display means such that the video camera has a field of view (FOV) directed toward said object or objects and originating at a screen of the video display means or behind the screen of the video display means and passing through a central portion thereof, wherein the means for generating the video signal further comprises a holographic optical element (HOE) disposed in front of a central portion of the video display and configured to receive object light reflected off of the object or object(s) and redirect a portion of the object light having selected wavelengths to form a holographic image in an FOV of the video camera.

2. The system of claim 1, wherein the video display means comprises a video projector and projection screen.

3. The system of claim 1, wherein the holographic image is generated by a holographic optical element (HOE) collector disposed in front of the video display means.

4. A method for performing a video conference, comprising:

disposing a partially-reflective plate in front of a video display in a first conference room, said partially-reflective plate to reflect a portion of light received on a front side thereof and enable light received on a backside thereof to pass through the plate without substantial attenuation, thereby enabling a local conference participant in a first conference room to view video images of a remote conference participant in a second conference room produced by the video display and corresponding to a received video signal generated by a second video camera disposed in the second conference room and directed toward the remote conference participant;

directing a first video camera to receive light reflected by the partially-reflective plate so as to capture a reflected image of the local participant in the first conference room such that the reflected image corresponds to a real image that would be obtained if the video camera was disposed behind the video display and had a field of view passing through a central portion of the video display and directed toward the local participant;

disposing a first polarizing component between said one or more local participants and the video display in the first conference room and disposing a second polarizing component between the first polarizing component and the first video camera, the first polarizing component comprising a linear polarizer and a circular polarizer;

generating a video signal via the first video camera corresponding to the reflected image and sending the video signal from the first conference room to the second conference room; and displaying a video image corresponding to the sent video signal on a video display located in the second conference room to be viewed by the remote conference participant.

5. The method of claim 4, wherein the video camera is directed at the partially-reflective plate such that an extended field of view for the video camera passing through the partially-reflective plate does not include a display screen portion of the video display.

6. The method of claim 5, further comprising providing a non-reflective surface to which the extended field of view is directed.

7. The method of claim 4, wherein the partially-reflective plate comprises a partially-silvered mirror.

8. The method of claim 4, wherein the partially-transparent plate comprises a sheet of Cellulose Acetate Butyrate (CAB) configured to provide linear and circular polarization, disposed over a transparent plate.

9. The method of claim 4, further comprising directing the first video camera at a mirror that is positioned to receive light reflected off of the partially-reflective plate corresponding to the reflected image.

10. The method of claim 4, wherein the first video camera is operatively coupled to a ceiling in the first conference room.

11. The method of claim 4, wherein the first video camera is operatively coupled to the partially-reflective plate.

12. A method for performing a video conference, comprising:

deploying video conference equipment at respective locations including:

a beam-splitting means, a video camera, and a video display, the beam-splitting means comprising one of a reflection holographic optical element or a transmission holographic optical element disposed in front of the video display to redirect a portion of light received on a front side thereof and enable a substantial portion of light received on a backside thereof to pass through, thereby enabling conference participants at the respective locations to view video images of conference participants at other locations; and performing operations at each location, including:

directing the video camera to receive light redirected by the beam-splitting means so as to capture an image of one or more participants at the location, said image corresponding to a real image that would be obtained if the video camera was disposed behind the video display and had a field of view passing through a central portion of the video display and directed toward said one or more participants;

generating a video signal via the video camera corresponding to the image and sending the video signal to at least one other location; and displaying a video image corresponding to a video signal received from at least one other location, whereby video conference participants at the respective locations are enabled to communicate with one another using eye-to-eye contact.

13. The method of claim 12, wherein the video signals are sent between locations over a computer network.

14. The method of claim 12, wherein the video signals are sent between locations using dedicated communication links.

15. An apparatus comprising:

a polarized plate to reflect a portion of light received on a front side thereof and enable light received on a backside thereof to pass through the plate without substantial attenuation;

a support member coupled to the partially-reflective plate to hold the polarizing plate at an angle relative to a video display screen when deployed in front of a video display; and a polarizing component disposed between the polarized plate and the video camera, the polarized plate further to receive object light reflected off of one or more objects generally disposed opposite the video display and reflect a portion of the received object light toward a video camera so as to produce a reflected image of said one or more objects by which a video image may be generated while enabling light corresponding to display images generated by the video display to be pass through to be viewed by a viewer generally located opposite the video display, wherein at least one of the polarized plate and the polarizing component comprises a circular polarizer and linear polarizer.

16. The apparatus of claim 15, wherein the polarized plate comprises a linear polarizer and a circular polarizer.

17. The apparatus of claim 15, wherein the polarized plate comprises a sheet of Cellulose Acetate Butyrate (CAB) disposed over a transparent plate.

18. The apparatus of claim 15, wherein the support member is configured to be coupled to a video display.

19. The apparatus of claim 15, wherein the support member comprises a transparent member configured to vertically-disposed in front of the video display.

20. The apparatus of claim 15, further comprising a camera support arm, operatively coupled to at least one of the support member or video display, including a camera mount to which a video camera may be mounted.

21. The apparatus of claim 20, further comprising a non-reflective surface operatively coupled to at least one of the polarizing plate and the video display to be disposed in an extended field of view of a video camera coupled to the support arm that passes through the polarizing plate.

22. The apparatus of claim 20, wherein the camera mount is pivotally-coupled to the camera support arm to enable a video camera mounted thereto to be tilted.

23. The apparatus of claim 20, wherein the support member comprises a transparent member vertically-disposed in front of the video display and coupled to the camera support arm.

24. The apparatus of claim 23, wherein the camera support arm is operatively coupled to the video display such that the support arm, support member and polarizing plate may be pivotally rotated about a vertical axis substantially passing through or parallel to the video display to support a pan function.

25. A method for enabling eye-to-eye contact in a video conference, comprising:

providing first and second conference rooms with respective first and second video cameras and first and second video display means;

generating a first video signal with the first video camera from which a first participant of the video conference located in the first conference room can be viewed via a video image displayed on the second video display means in the second conference room, said first video signal effectively containing an image of the first participant corresponding to a real image that would be produced if the first video camera had a field of view (FOV) originating at a screen of the first video display means or behind the screen of the first video display means and passing through a central portion thereof, the video image corresponding to the first video signal being generated from a holographic image produced from object light of selected wavelengths reflected off of the first participant, said holographic image being directed toward an FOV of the first video camera;

sending the first video signal to the second conference room;

displaying a video image corresponding to the first video signal on the second video display means to enable a second participant in the second conference room to view the first video participant;

while at substantially the same time, generating a second video signal with the second video camera from which the second participant can be viewed via a video image displayed on the first video display means in the first conference room, said second video signal effectively containing an image of the second participant corresponding to a real image that would be generated if the second video camera had a field of view (FOV) originating at or behind a screen of the second video display means and passing through a central portion thereof;

sending the second video signal to the first conference room; and displaying a video image corresponding to the second video signal on the first video display means to enable the first participant to view the second video participant, whereby, from their respective perspectives, the first and second video participants appear to be looking at each other eye-to-eye.

26. The method of claim 25, wherein the holographic image is generated by a holographic optical element collector disposed in front of the first video display means.

* * * * *